Sept. 16, 1958            J. SIMON            2,852,242

APPARATUS FOR SEALING AN END OF A ROTARY DRUM APPARATUS

Filed Jan. 28, 1955            2 Sheets-Sheet 1

Inventor:
JOSEF SIMON
BY Robert H. Jacob
AGENT

Sept. 16, 1958   J. SIMON   2,852,242
APPARATUS FOR SEALING AN END OF A ROTARY DRUM APPARATUS
Filed Jan. 28, 1955   2 Sheets-Sheet 2
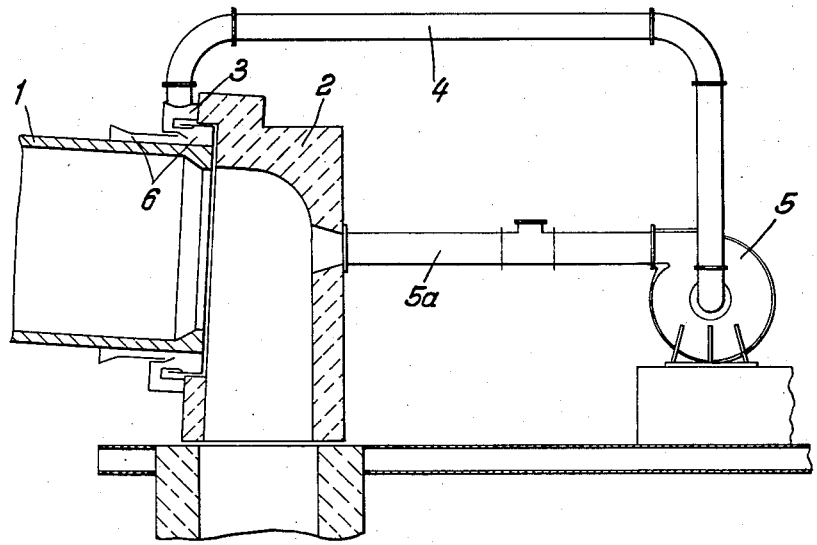
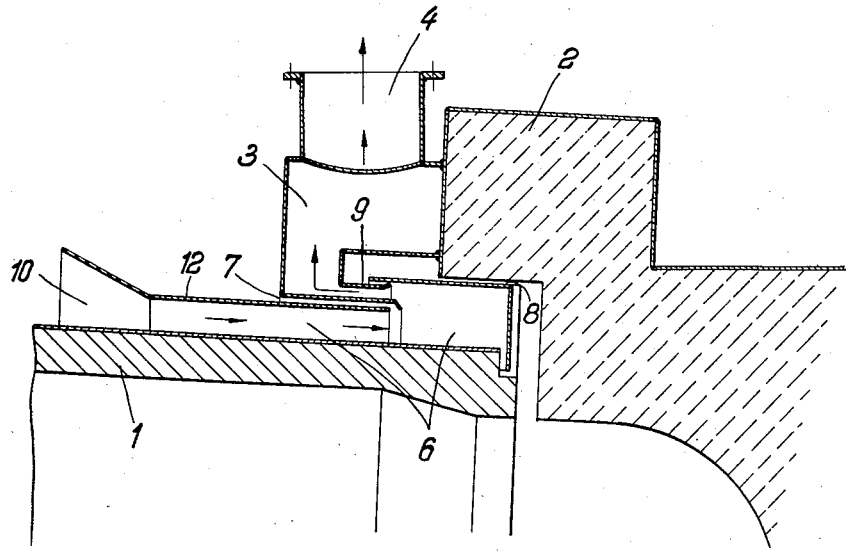
Inventor:
JOSEF SIMON
BY Robert H. Jacob
AGENT United States Patent Office 2,852,242
Patented Sept. 16, 1958

2,852,242

APPARATUS FOR SEALING AN END OF A ROTARY DRUM APPARATUS

Josef Simon, Frankfurt am Main Hochst, Germany

Application January 28, 1955, Serial No. 484,717

5 Claims. (Cl. 263—33)

In cylindrical rotary drum apparatus such as kilns, drying drums, heating furnaces and the like, such apparatus being used, for example, for the production of cement, or the treatment of lime, gypsum, magnesite, chemical and other industrial materials, it is important to obtain as effective a seal as possible at both ends of the apparatus but particularly at the outlet end, in order to prevent, on the one hand, access of air into the apparatus from the outside, and, on the other hand, escape of dust and gases from the apparatus. Dependably acting seals of this kind are especially important for the purpose of maintaining a controlled combustion in a cylindrical rotary kiln.

Seals of various kinds have hitherto been used for this purpose, for example labyrinth seals, pressure seals, and so on. These seals are not sufficiently resistant to the stresses generally occurring at the place of sealing and are liable to be adversely affected by high temperatures, dust diffusion, and so on. With known seals considerable wear frequently occurs after a short operational period, so that these seals are in the long run unsatisfactory for reasons of economy and for operational reasons.

In addition to the known seals above referred to, a seal has been proposed for cylindrical rotary kilns which comprises an air chamber disposed at the gap to be sealed and to which a fan is connected, for producing an underpressure or suction in the said air chamber. With this known seal the arrangement is such that the air chamber is disposed in the region of the gap to be sealed at a distance from the kiln head, so that the outer air drawn in by means of the fan enters the air chamber substantially between the air chamber and the kiln head. This means that the indrawn outer air is given the same direction of flow as far as the fan connection, as that in which the gases could emerge at the end of the kiln. An additional suction is, however, thereby exerted on the interior of the kiln head so that undesired additional amounts of gas and dust can emerge from the kiln.

The invention aims at improving this latter known type of seal by arranging that the direction of flow of the indrawn outer air is opposed to the direction of any gases emerging from the rotary drum. Thus without using mechanically acting sealing means the sealing effect is dependably achieved, without increasing the possibility of additional amounts of gas or dust emerging from the kiln or the like.

The invention thus involves the mounting of an aerodynamic air lock at the gap to be sealed, for example between the end of the rotary drum and the head of a cylindrical rotary kiln. Friction between parts working against one another mechanically is thus avoided and wear produced thereby is precluded. An arrangement according to the invention is extremely simple technically and permits a far better performance operationally.

Further details of the invention will be clear from the examples illustrated in the accompanying drawings, wherein:

Figure 3 is similar to Figure 1 but shows a modified sealing arrangement, and

Figure 4 shows a portion of Figure 3 drawn to a larger scale.

Figure 1:
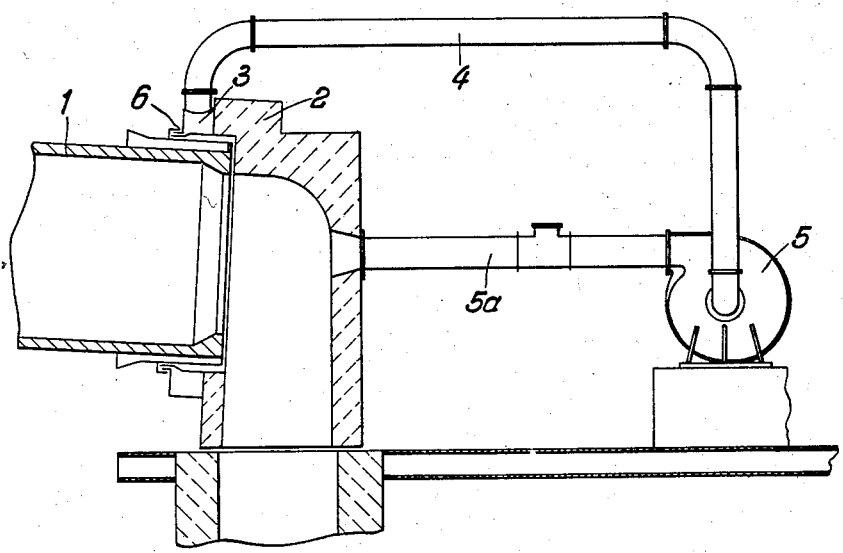
Figure 1 is a diagrammatic sectional side elevation of a rotary kiln end within the head of the kiln, a seal in accordance with the invention being provided by an air chamber arrangement connected with a fan, which at the same time feeds the kiln with air for combustion.
Figure 2:
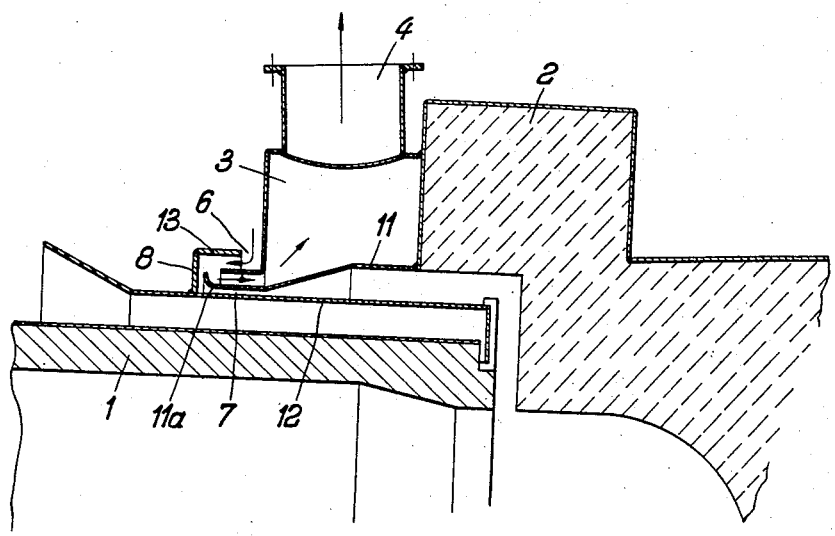
Figure 2 shows a portion of Figure 1 drawn to a larger scale.

In front of a rotary kiln end 1, Figures 1 and 2, there is disposed a kiln head 2. An air chamber 3 surrounding the end of the rotary kiln is provided at the gap to be sealed, this gap being between the end of the kiln 1 and the kiln head 2. The said air chamber 3 is connected through a suction pipe 4 to a fan 5, and the latter forces through its delivery pipe 5a combustion air together with the appertaining fuel, this mixture then passing from the kiln head 2 into the kiln 1.

As illustrated in Figure 2, the air chamber 3 is closed off at its inner side by a wall 11. The said wall 11 is extended through the passage-way for the inlet of the outer air. The outer extremity 11a of the wall 11 is bent outwardly. The flow cross-section for the outer air, which enters at the inlet aperture 6, is larger than the flow cross-section 7 between the wall 11 and a wall 12 surrounding the end of the kiln to produce a cooling jacket space for such kiln end 1. The outer air drawn in through the suction pipe 4 thus finds as a result of the relatively large cross-section of inflow in to the air chamber 3, a low resistance, and, given a suitable draught through the suction pipe 4, it is impossible for outer air to pass through the gap 7 into the interior of the kiln.

If a certain pressure above atmospheric is to exist, even only at times, inside the kiln, so that there is a tendency for gas to emerge from the kiln through the gap 7, these gases are so deflected by the bent-over edge 11a of the wall 11 in conjunction with the bent-over housing 13 that the direction of movement of this gas is opposed to the direction of movement of the outer air drawn into the chamber 3. The result of this is that the emergence of the gases is effectually opposed. Various air conditions contingent on the manner of operating the kiln may prevail at the periphery of the kiln in the sealing gap. At the lower part of the outlet end of the kiln, there may for example be a relatively great tendency for infiltration of air, while at the upper part there may in certain circumstances be a tendency for the kiln gases to emerge at the same moment. In order to deal with this, a plurality of suction connections 4 may be distributed around the air chamber 3 surrounding the kiln end.

The modified example in Figures 3 and 4 is distinguished from the example in Figures 1 and 2 principally in that the cooling jacket formed by the wall 12 serves at the same time as an inflow passage for the outer air to be drawn through the air chamber 3. The outer air thus enters at the inlet aperture 10 and follows the path indicated by the arrows. The gap between the head of the kiln 2 and the point indicated by reference numeral 8, and similarly the gaps indicated by reference numerals 7 and 9, are made as narrow as possible in relation to the substantially larger flow cross-sections through the cooling passage 6. Thus, paths for the emergence of gases from the kiln are effectually obstructed by opposed air flow. The heat radiating from the end of the kiln can be recovered by restoring the heat to the rotary kiln. This is accomplished by the air being drawn through the cooling passage 6 through the air chamber 3 and the suction pipe 4 into the fan 5 and delivered in heated condition through the pipe 5a. Such delivery of air into the rotary kiln is preferably used only in the case of coal-dust firing. In the case of oil or gas firing independent fans will be used for the suction of the sealing air and for the supply of combustion air.

I claim:

1. Sealing means for apparatus of the rotary drum type having a stationary drum head presenting conformations disposed around one end of the rotary drum and defining a friction eliminating space around said drum end, said sealing means comprising a suction chamber defined in said stationary drum head and presenting a pair of concentric members disposed circumferentially of said drum and constituting the entrance channel to said suction chamber, a first annular conformation mounted around and extending circumferentially of said drum end proximate one of said pair of concentric members and defining with said one concentric member an annular outer air intake channel for outer air, and a second annular conformation proximate the other of said pair of concentric members defining with said other member a channel for gases from said drum and said friction eliminating space, said concentric members extending adjacent to each other in the same direction and intermediate said first and second annular conformations whereby suction from said chamber causes flow of gaseous substance such as air through said concentric members defining said entrance channel into said chamber in one direction while the flow in said intake channel and in said friction eliminating space is in the direction opposite to said one direction.

2. Sealing means in accordance with claim 1, where the annular intake channel between said first annular conformation and said one concentric member is of greater cross sectional area than said friction eliminating space.

3. Sealing means in accordance with claim 1, wherein that of said concentric members which is disposed closest to said drum projects with its free edge beyond the edge of the other of said members and is bent to locate said free edge in alignment with the other of said members.

4. Sealing means in accordance with claim 1, wherein said first annular conformation is defined by a cooling jacket supported on said drum.

5. Sealing means in accordance with claim 1, wherein said suction chamber is provided with a plurality of air suction connections around the periphery of said drum.

References Cited in the file of this patent

UNITED STATES PATENTS

| | | |
|---|---|---|
| 1,998,492 | Christensen | Apr. 23, 1935 |
| 2,007,676 | Falla | July 9, 1935 |
| 2,653,810 | Heilmann | Sept. 29, 1953 |